United States Patent [19]

Shono

[11] Patent Number: 5,290,620
[45] Date of Patent: Mar. 1, 1994

[54] STRUCTURE OF ATTACHING A MEMBER ADAPTED TO BE ADHERED TO A SUBJECT MEMBER

[75] Inventor: Tetsuji Shono, Kawagoe, Japan

[73] Assignee: Asahi Kagaku Kabushiki Kaisha, Tokyo, Japan

[21] Appl. No.: 942,781

[22] Filed: Sep. 10, 1992

[30] Foreign Application Priority Data

Sep. 12, 1991 [JP] Japan .................. 3-081767[U]

[51] Int. Cl.5 .................. B32B 7/00; B32B 31/00
[52] U.S. Cl. .................. 428/120; 156/293; 156/294; 428/63; 428/343
[58] Field of Search .............. 428/63, 120, 343; 156/293, 294

[56]  References Cited

U.S. PATENT DOCUMENTS

| 4,036,674 | 7/1977 | Labenz | 428/63 |
| 4,273,598 | 6/1981 | Bowdith | 428/63 |
| 4,338,151 | 7/1982 | Hutter | 428/63 |
| 4,650,706 | 3/1987 | Emmel | 428/40 |
| 4,810,545 | 3/1989 | Snodgrass | 428/120 |
| 4,911,773 | 3/1990 | Leighton | 428/63 |

Primary Examiner—George F. Lesmes
Assistant Examiner—Blaine Copenheaver
Attorney, Agent, or Firm—Sandler, Greenblum & Bernstein

[57] ABSTRACT

A member to be adhered is provided with a body having a bonding surface on which an adhesive is applied, and a non-bonding surface from which a grip portion is integrally formed, allowing insertion of the body into a sealed member.

13 Claims, 2 Drawing Sheets

STRUCTURE OF ATTACHING A MEMBER ADAPTED TO BE ADHERED TO A SUBJECT MEMBER

BACKGROUND OF THE INVENTION

The present invention relates to a structure for attaching a member adapted to be adhered to a subject member.

Conventionally, it has been difficult to stably bond a sealing member (corresponding to a member to be adhered) to a sealed member (corresponding to a subject member) in the case where the sealing member is small in its size, or in the case where the sealing member has a smaller non-sealing portion, i.e. a portion to be gripped by a pincette and the like.

Furthermore, in the case where a surface on which the adhesive material is coated is relatively large, the adhesive material tends to contaminate the hands of workers. Thus, the bonding operation for such a sealing material was remarkably worsened in its labor effectiveness.

SUMMARY OF THE INVENTION

It is therefore an object of the present invention to provide a structure for attaching a member adapted to be adhered to a subject member, which can improve labor effectiveness in a bonding operation, and can be held stably and handled easily by a worker during the bonding operation.

In order to accomplish the above purpose, the present invention provides a structure for attaching a member to be adhered to a subject member, including a body having a bonding surface which is adhered to the subject member, a non-bonding surface, and a grip portion integrally formed to the body on the non-bonding surface thereof.

With this arrangement, the bonding operation can be facilitated since workers can handle the member to be adhered, smoothly, by holding the grip portion integrally formed on the non-bonding surface of the member. Thus, the labor effectiveness is improved.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, one embodiment of a sealing member which is applied to a structure for attaching a member to be adhered to a subject member, of the present invention will be explained with reference to the accompanying drawings of FIG. 1 and FIG. 2.

Figure 1:
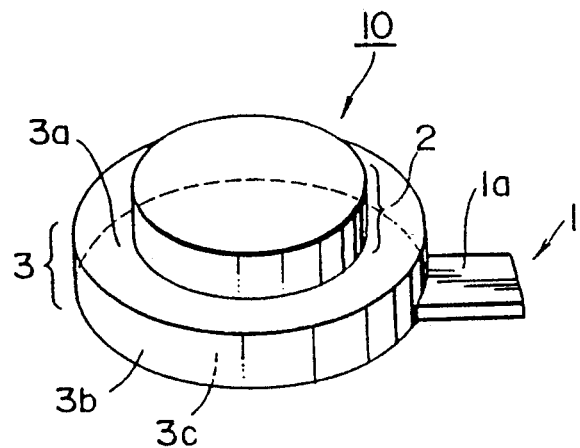
FIG. 1 is a perspective view showing a sealing member which is applied to a structure for attaching a member to be adhered to a subject member, in accordance with one embodiment of the present invention.
Figure 2:
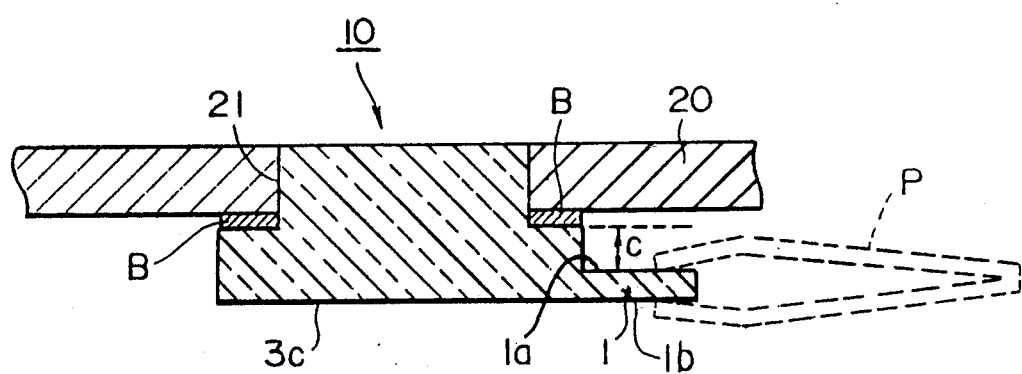
FIG. 2 is a cross-sectional view showing a coupled condition of the sealing member and a sealed member being bonded together by an adhesive.

FIG. 1 shows a perspective view showing a sealing member 10 as a member to be adhered, of one embodiment according to the present invention. A sealing member 10 has a configuration including two coaxial cylindrical columns. That is, a smaller diameter column portion is a cylindrical coupling portion 2, while a larger diameter portion is a cylindrical non-coupling portion 3 which is integrally formed with the cylindrical coupling portion 2 in a coaxial manner.

The non-coupling portion 3 has an upper bonding surface 3a on its upper surface, a non-bonding side (or circumferential) surface 3b on its side (or circumferential) surface, and a non-bonding lower surface 3c on its lower surface. It should be noted that the upper bonding surface 3a is formed as a ring-like shape. In this embodiment, an adhesive B is applied to the upper bonding surface 3a.

The sealing member 10 includes a grip portion 1 which is integrally formed with the sealing member 10, and extends in a radial direction away from the sealing member 10. More specifically, the grip portion 1 is integrally formed to the non-bonding side surface 3b of the non-coupling portion 3 (i.e. the circumferential surface of a larger diameter portion of the sealing member 10).

The grip portion 1 has a flat configuration, including an upper flat surface 1a and a lower flat surface 1b. The upper flat surface 1a is parallel to the bonding surface 31 and stepped down from the bonding surface 3a by a prescribed clearance C, while the lower flat surface 1b is set to be flush with the non-bonding lower surface 3c of the non-coupling portion 3.

In a bonding operation of the sealing member 10 to a sealed member 20 as a subject member, a worker holds the flat grip portion 1 by a handling tool such as a pincette (pincers) P or the like, in other words, clamps the flat grip portion 1 between the upper and lower flat surfaces 1a and 1b by the pincette P. It should be noted that the clearance C is designed so as to prevent the pincette P from interfering with the undersurface of the sealed member 20. By stably holding the grip portion 1 by the pincette P, the coupling portion 2 can be easily inserted through a throughhole 21 formed in the sealed member 20. Then, the upper bonding surface 3a of the non-coupling portion 3 is adhered to the lower surface of the sealed member 20 by the adhesive B which is applied to the bonding surface 3a of the non-coupling portion 3. Accordingly, the sealing member 10 is stably and easily attached to the sealed member 20, or, the sealed member 20 is stably and easily sealed by the sealing member 10, in this embodiment.

It would be clear that the present invention is not limited to the embodiment described above, nor those illustrated in the drawings, and the invention can be modified without departing from the spirit and scope of the claimed invention.

For example, the grip portion 1 is formed on the non-bonding side surface 3b of the sealing member 10 in the embodiment. Please note that the place where the grip portion 1 is provided is not limited to the one disclosed in the above-described embodiment.

The grip portion 1 can be formed integrally on, for example, the non-bonding lower surface 3c of the sealing member 10 (i.e. a lower surface of the larger diameter portion of the sealing member 10). That is, the grip portion 1 can be provided at any place on the non-bonding surface as long as the grip portion 1 is easily held or handled by the pincette P, or the like, by workers.

Figure 3A:
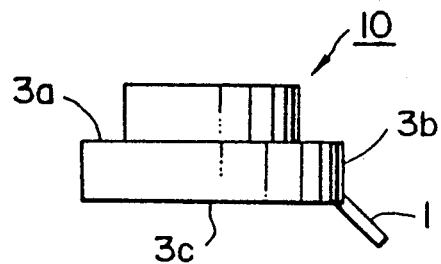
FIGS. 3A to 3C are views showing a sealing member which is applied to a structure for attaching a member to be adhered to a subject member, in accordance with other embodiments of the present invention.
Figure 3B:
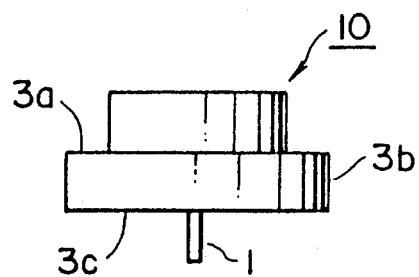
Figure 3C:
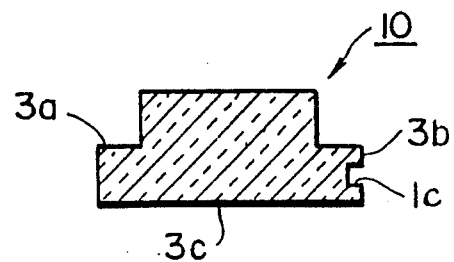

FIGS. 3A, 3B, and 3C show other embodiments of the grip portions 1, which are provided at various places different from the above-described embodiment.

In an embodiment of FIG. 3A, the grip portion 1 is formed obliquely downward from an edge which is defined between the non-bonding side surface 3b and the non-bonding lower surface 3c of the sealing member 10. In other words, the grip portion 1 is provided to extend obliquely from the edge of the larger diameter portion, so as to depart from the sealed member 20.

In an embodiment of FIG. 3B, the grip portion 1 is formed downward from a center of the non-bonding lower surface 3c (i.e. a larger diameter portion) of the sealing member 10.

Above-described grip portions 1 (shown in FIGS. 1, 3A, and 3B) are characterized as a protruding type. That is, the grip portion 1 is basically formed to protrude from the main body of the sealing member so that the grip portion 1 can be easily held by a pincette P, or the like, by workers. The grip portion 1 is fairly small compared with the main body of the sealing member 10.

Furthermore, after having finished the bonding operation, the grip portion 1, can be removed. Therefore, it is preferable to provide a weakened portion such as a slit and a groove at a base end of the grip portion 1 so that the grip portion 1 can be easily removed from the main body of the sealing member.

FIG. 3C shows a recessed type grip portion. That is, in the embodiment shown in FIG. 3, a hole 1c for gripping is formed on the non-bonding side surface 3b of the sealing member 10. A depth of the gripping aid hole 1c is designed in such a manner that the gripping aid hole 1c can be easily held by the pincette P, or the like.

This gripping aid hole 1c can be formed at the non-bonding lower surface 3c, instead of the non-bonding side surface 3b.

In the case where the present invention is applied to a water-proof camera, the sealed member 20 is a camera body, and the sealing member 10 is a transparent material which allows the user to watch a film cartridge loaded in the camera body.

Furthermore, in one embodiment described above, the adhesive B is applied to the upper bonding surface 3a of the non-coupling portion 3. However, the adhesive B could be applied to the undersurface of the sealed member 20 on the outer peripheral area around the through hole 21 thereof, as well as the upper bonding surface 3a, or instead of the upper bonding surface 3a.

As is described in the foregoing description, in accordance with the present invention, the bonding operation can be extremely improved in the labor effectiveness since the workers can easily handle the sealing member by holding the grip portion by the pincette P or the like.

Furthermore, the description is given to the sealing member 10 which is applied to the structure for attaching the member to be adhered to the subject member, of the present invention, however, the present invention is also applicable to a member which is only adhered to the subject member, that is, which has not a sealing function.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A structure for attaching a member to be adhered to a subject member, comprising:

a body having an optically transparent portion having an outer peripheral surface, and a flange portion integrally formed with said outer peripheral surface, a bonding surface which is formed on the end surface of said flange portion and is adapted to be adhered to a subject member, and a non-bonding surface; and a grip portion integrally formed to said body on said non-bonding surface thereof;

said body including a small portion formed in a cylindrical shape to be inserted into a hole which is formed in the subject member, and said flange portion including a large portion formed of a cylindrical shape which is adjacent the subject member, and said bonding surface is defined by a peripheral surface portion of said large portion of said flange portion on which said small portion is formed and which is positioned around said small portion.

2. The structure according to claim 1, wherein said grip portion is formed to have a predetermined clearance from said bonding surface.

3. The structure according to claim 2, wherein said clearance between said grip portion and said bonding surface is designed so as to prevent a holding tool from interfering with the subject member in a bonding operation.

4. The structure according to claim 3, wherein said grip portion has a flat configuration having a flat surface opposing to the subject member.

5. The structure according to claim 4, wherein said flat surface of said grip portion is stepped down from said bonding surface by a predetermined clearance.

6. The structure according to claim 1, wherein said grip portion extends obliquely so as to depart from said subject member.

7. The structure according to claim 6, wherein said grip portion extends from an edge of said non-bonding surface.

8. The structure according to claim 1, wherein said grip portion is formed from said non-bonding surface, so as to extend perpendicular to said non-bonding surface at a center thereof.

9. The structure according to claim 1, wherein said non-bonding surface includes a non-bonding opposite surface, opposing to said bonding surface, and a non-bonding side surface interconnecting between the edges of said bonding surface and said non-bonding opposite surface.

10. The structure according to claim 9, wherein said grip portion is formed obliquely downward from an edge between said non-bonding side surface and said non-bonding opposite surface.

11. The structure according to claim 9, wherein said grip portion is formed so as to extend perpendicular to said non-bonding opposite surface at a center of said non-bonding opposite surface.

12. The structure according to claim 1, wherein said small cylindrical portion is coaxial with said large cylindrical portion.

13. The structure according to claim 12, wherein said bonding surface of said flange portion is formed by a ring-like surface portion positioned around said small cylindrical portion.

* * * * *

UNITED STATES PATENT AND TRADEMARK OFFICE
CERTIFICATE OF CORRECTION

PATENT NO. : 5,290,620
DATED : March 1, 1994
INVENTOR(S) : T. SHONO

It is certified that error appears in the above-indentified patent and that said Letters Patent is hereby corrected as shown below:

On the title page item [73], under Assignee, change "Asahi Kagaku Kabushiki" to ---Asahi Kogaku Kogyo Kabushiki---

Signed and Sealed this

Eighteenth Day of October, 1994

Attest:

BRUCE LEHMAN

Attesting Officer          Commissioner of Patents and Trademarks